United States Patent
Miyoshi

(10) Patent No.: US 8,149,949 B2
(45) Date of Patent: Apr. 3, 2012

(54) RADIO TRANSMITTER APPARATUS, RADIO RECEIVER APPARATUS, AND WIRELESS COMMUNICATION SYSTEM

(75) Inventor: Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/551,126

(22) Filed: Aug. 31, 2009

(65) Prior Publication Data

US 2009/0316825 A1    Dec. 24, 2009

Related U.S. Application Data

(62) Division of application No. 11/579,860, filed on Nov. 8, 2006, now Pat. No. 7,715,497.

(30) Foreign Application Priority Data

May 11, 2004 (JP) .................................. 2004-140968

(51) Int. Cl.
*H04L 27/00* (2006.01)
(52) U.S. Cl. ...................................... 375/295
(58) Field of Classification Search .................. 375/260, 375/316, 324, 340, 349, 261, 267, 268, 271, 375/279, 295, 298, 300, 302, 308, 309
See application file for complete search history.

(56) References Cited

U.S. PATENT DOCUMENTS

| 7,372,908 B2 | 5/2008 | Miyoshi |
| 2003/0120990 A1 | 6/2003 | Elbwart et al. |
| 2004/0066838 A1* | 4/2004 | Choi et al. .................... 375/146 |
| 2004/0199846 A1 | 10/2004 | Matsumoto et al. |
| 2006/0120467 A1 | 6/2006 | Miyoshi et al. |

FOREIGN PATENT DOCUMENTS

| EP | 1 313 247 | 5/2003 |
| JP | 11-266224 | 9/1999 |
| JP | 2003209588 | 7/2003 |
| JP | 2003-258757 | 9/2003 |
| JP | 2003309535 | 10/2003 |
| JP | 20056115 | 1/2005 |
| WO | 98/29979 | 7/1998 |
| WO | 2004/036817 | 4/2004 |

OTHER PUBLICATIONS

Russian Office Action dated Jan. 23, 2009 with English translation thereof.
Japanese Notice of the Reasons for Rejection dated Aug. 24, 2010.

(Continued)

*Primary Examiner* — Sam K Ahn
(74) *Attorney, Agent, or Firm* — Dickinson Wright PLLC

(57) ABSTRACT

A wireless communication system capable of obtaining diversity gain without fail even when the distribution of the reception qualities is large. In a radio transmitter apparatus (100) of the wireless communication system, a repetition/constellation pattern ratio deciding part (113) adjusts the number of constellations to be used by a modulating part (102) and also adjusts the number of replicas of a repetition part (103) in such a manner that the product of the number of constellation patterns to be used by the modulating part (102), that is, the number of outbound symbols to be generated and the number of outbound symbols as replicated by the repetition part (103) becomes equal to the number of outbound symbols generated from a single transmission data notified from a control information extracting part (112).

9 Claims, 8 Drawing Sheets

OTHER PUBLICATIONS

PCT International Search Report dated Aug. 2, 2005.
K. Miyoshi, et al.; "Constellation rearrangement and spreading code rearrangement for hybrid ARQ in MC-CDMA," Wireless Personal Multimedia Communications, 2002, The 5th International Symposium on vol. 2, Aug. 30, 2002, pp. 668-672.
European Search Report dated Apr. 21, 2011.

* cited by examiner

| SYMBOL COMBINATION | DISPERSION OF RECEPTION QUALITY IS SMALL | DISPERSION OF RECEPTION QUALITY IS LARGE |
|---|---|---|
| | SMALL | LARGE |
| BIT COMBINATION | LARGE | SMALL |

FIG.1

RADIO TRANSMITTER APPARATUS, RADIO RECEIVER APPARATUS, AND WIRELESS COMMUNICATION SYSTEM

This is a divisional application of application Ser. No. 11/579,860 filed Nov. 8, 2006, which is a national phase under 35 USC 371 of PCT/JP2005/008198 filed Apr. 28, 2005, which is based on Japanese application number 2004-140968 filed May 11, 2004, the entire contents of each of which are incorporated by reference herein.

TECHNICAL FIELD

The present invention relates to a radio communication system for replicating transmission data (hereinafter, referred to as "repetition" as appropriate) to be transmitted, and a radio transmission apparatus and radio reception apparatus used in this system.

BACKGROUND ART

Conventionally, in a multicarrier communication system, a technique has been used where a multicarrier communication apparatus on a receiving side combines a last received packet and re-received packet and performs decoding, thereby obtaining the diversity gain in the time domain and reducing a bit error rate of the packet.

Further, another technique has been developed where a multicarrier communication apparatus on a transmitting side modulates a packet using a different constellation pattern from that of the last transmitted packet when re-transmitting the packet, and exchanges higher-order bits and lower-order bits of the last transmitted packet to obtain the diversity gain in the time domain, thereby reducing a bit error rate of the packet (for example, see Patent Document 1).
Patent Document 1: Japanese Patent Application Laid-Open No. 2003-309535

DISCLOSURE OF INVENTION

Problems to be Solved by the Present Invention

However, with the technique as described in Patent Document 1, the multicarrier communication apparatus on the receiving side does not obtain the diversity gain in the frequency domain that is derived from characteristics of a multicarrier signal though it obtains the diversity gain in the time domain, and there is therefore room for improving the diversity gain.

Further, in the technique as described in Patent Document 1, higher-order bits and lower-order bits of the last transmitted packet are always exchanged and re-transmitted. Here, a diversity gain has a characteristic of being obtained more easily in performing symbol combination than in performing bit combination when the dispersion of quality of a received signal is large, and being obtained more easily in performing bit combination than in performing symbol combination when the dispersion of the reception quality is small. FIG. 1 shows this characteristic in the table. Accordingly, with the technique described in Patent Document 1, when the dispersion of the reception quality is large, bit combination is performed on the last transmitted packet and re-received packet in which the higher-order bits and the lower-order bits of the last transmitted packet are exchanged, and there is therefore a problem that the diversity gain is hard to obtain.

It is therefore an object of the present invention to provide a radio transmission apparatus, radio reception apparatus and radio communication system capable of reliably obtaining the diversity gain when the dispersion of reception quality of a received signal is large.

Means for Solving the Problem

In the present invention, a radio transmission apparatus performs modulation and replication on transmission data using a plurality of constellation patterns to generate a plurality of transmission symbols, and transmits the generated plurality of transmission symbols in a single multicarrier signal by radio, and a radio reception apparatus performs symbol combination and bit combination on the received multicarrier signal.

ADVANTAGEOUS EFFECT OF THE PRESENT INVENTION

According to the present invention even when the dispersion of reception quality of a multicarrier signal is large in the radio reception apparatus, it is possible to reliably obtain the diversity gain in the frequency domain.

BRIEF DESCRIPTION OF DRAWINGS

FIG. 1 is a table showing a characteristic of the diversity gain;

BEST MODE FOR CARRYING OUT THE PRESENT INVENTION

An embodiment of the present invention will be described below in detail with reference to the accompanying drawings. In the following descriptions, a transmitting side of a multicarrier signal is referred to as a radio transmission apparatus, and a receiving side of the multicarrier signal is referred to as a radio reception apparatus.

Figure 2:
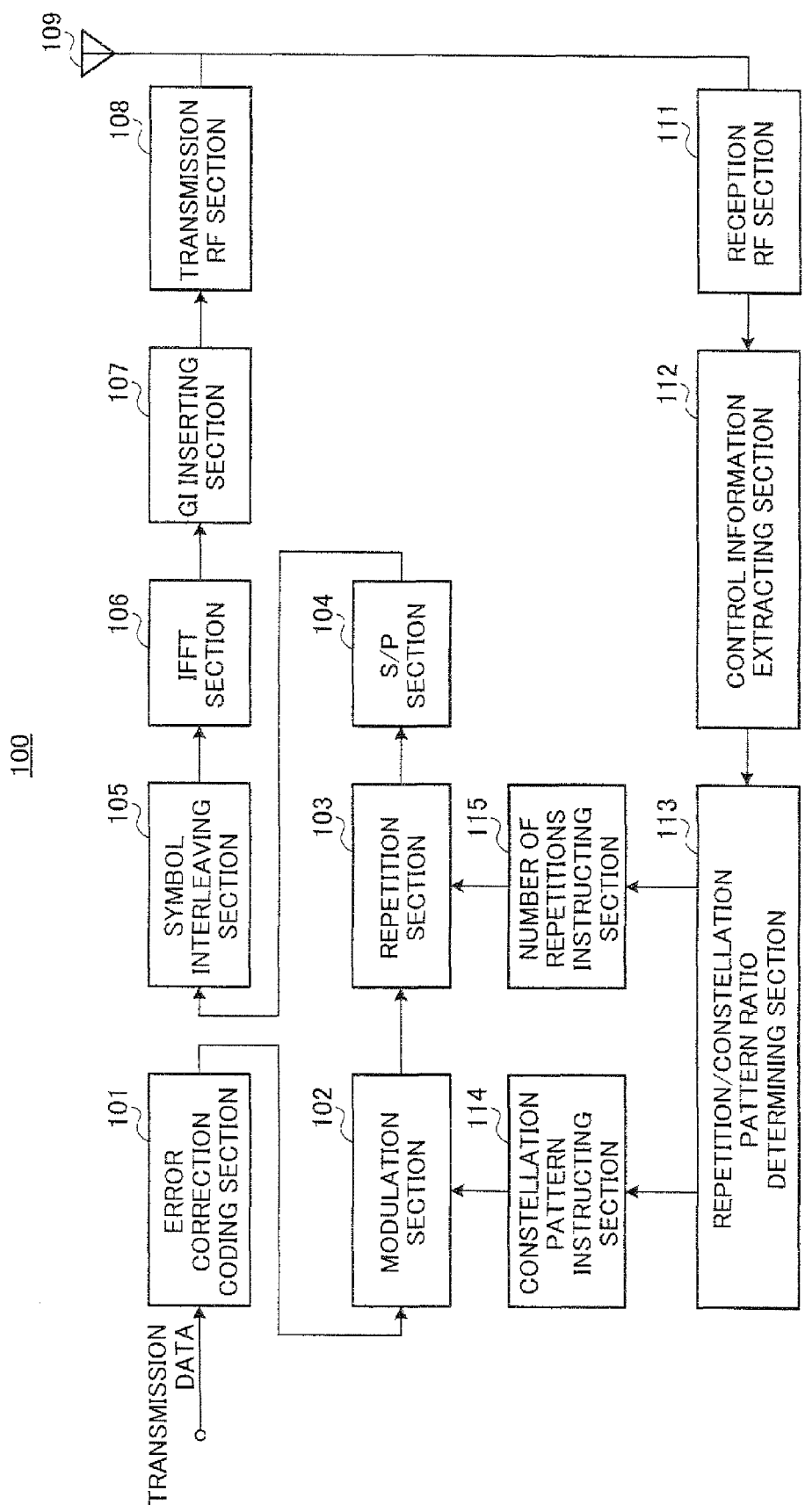
FIG. 2 is a block diagram illustrating a configuration of a radio transmission apparatus according to one embodiment of the present invention.

FIG. 2 is a block diagram illustrating a configuration of radio transmission apparatus 100 according to one embodiment of the present invention.

Figure 3:
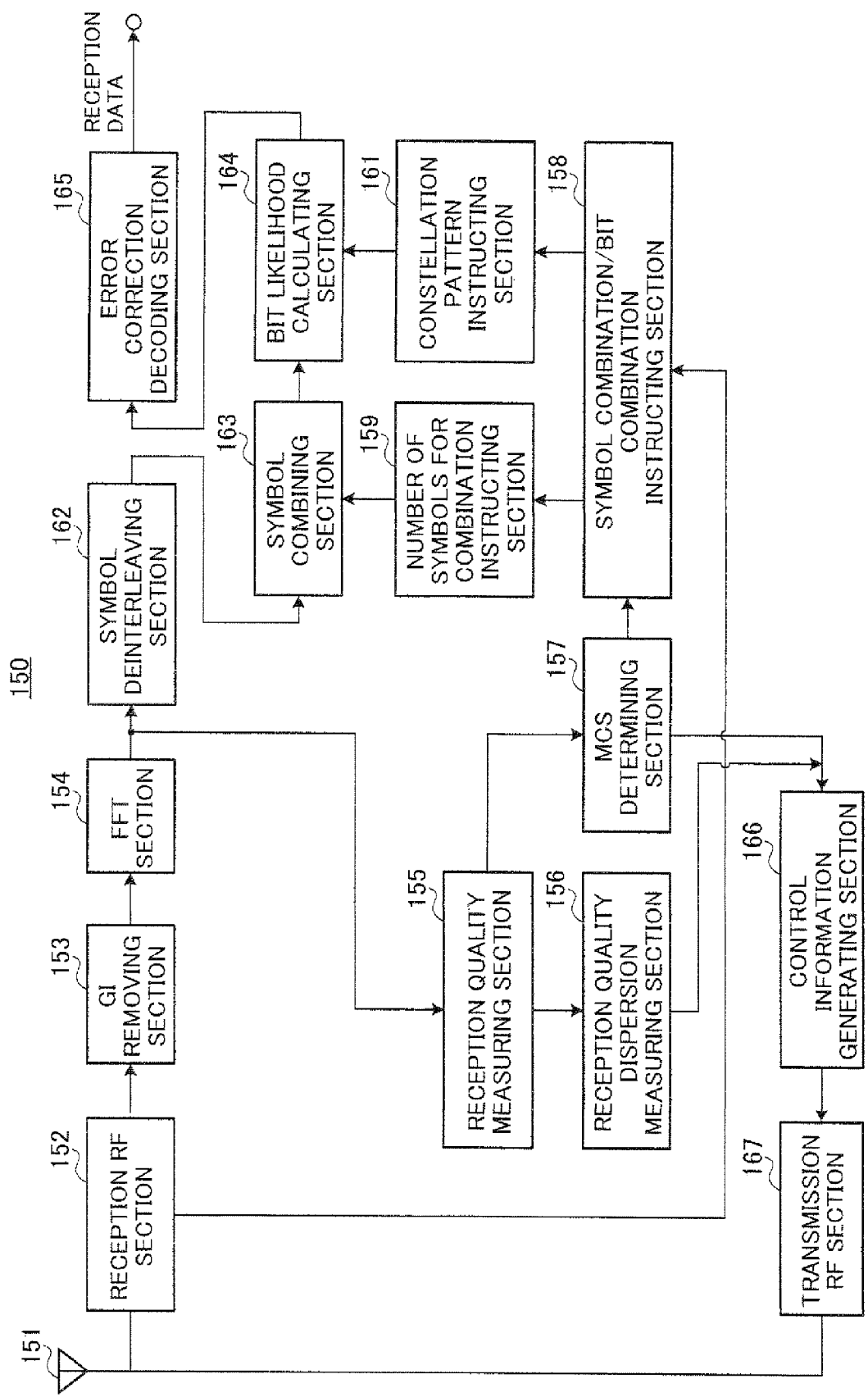
FIG. 3 is a block diagram illustrating a configuration of a radio reception apparatus according to one embodiment of the present invention.

FIG. 3 is a block diagram illustrating a configuration of radio reception apparatus 150 according to one embodiment of the present invention. Radio transmission apparatus 100 is installed in a base station apparatus, for example. Radio reception apparatus 150 is installed in a communication terminal apparatus such as a cellular telephone. Further, radio transmission apparatus 100 and radio reception apparatus 150 are components of a radio communication system such as a mobile communication system.

Radio transmission apparatus 100 as shown in FIG. 2 has: error correction coding section 101, modulation section 102; repetition section 103; serial/parallel (S/P) section 104; symbol interleaving section 105, inverse fast Fourier transform (IFFT) section 106; guard interval (GI) inserting section 107; transmission radio frequency (RF) section 108; antenna element 109; reception RF section 111; control information extracting section 112; repetition/constellation pattern ratio determining section 113; constellation pattern instructing section 114; and number of repetitions instructing section 115.

Error correction coding section 101 performs error correction coding on transmission data inputted from, for example, a baseband section (not shown) at a predetermined coding rate, for example, R=1/3, and inputs the transmission data after error correction coding to modulation section 102.

Modulation section 102 modulates the transmission data inputted from error correction coding section 101 using a modulation scheme and constellation pattern specified by constellation pattern instructing section 114 (described later) to generate a transmission symbol. For example, if modulation section 102 is instructed to use two constellation patterns in 16QAM by constellation pattern instructing section 114, modulation section 102 modulates the transmission data inputted from error correction coding section 101 using these two constellation patterns and generates two transmission symbols. Then, modulation section 102 inputs the generated transmission symbols to repetition section 103. Modulation section 102 is able to use all constellation patterns in such as QPSK (Quadrature Phase Shift Keying), 16QAM (Quadrature Amplitude Modulation), 64QAM, and 256QAM.

Repetition section 103 replicates the transmission symbols inputted from modulation section 102 up to the number of replications instructed by number of repetitions instructing section 115 (described later), and inputs the replicated transmission symbols to S/P section 104. Accordingly, modulation section 102 and repetition section 103 constitute a modulation/replication section.

S/P section 104 converts the transmission symbols inputted from repetition section 103 from a serial signal into a parallel signal, and inputs the parallel signal to symbol interleaving section 105.

Symbol interleaving section 105 interleaves the parallel signal inputted from S/P section 104 on a symbol basis, and inputs the interleaved parallel signal to IFFT section 106.

IFFT section 106 performs inverse fast Fourier transform on the parallel signal inputted from symbol interleaving section 105, thereby generating an OFDM (Orthogonal Frequency Division Multiplexing) signal that is a multicarrier signal. Then, IFFT section 106 inputs the generated OFDM signal to GI inserting section 107.

GI inserting section 107 inserts a GI into the generated OFDM signal inputted from IFFT section 106, and inputs the OFDM signal after the GI insertion to transmission RF section 108.

Transmission RF section 108 has, for example, a digital/analog converter, low noise amplifier, and band pass filter, performs predetermined radio transmission processing on the OFDM signal inputted from GI inserting section 107, and transmits the radio OFDM signal after processing to radio reception apparatus 150 via antenna element 109. In addition, transmission RF section 108 reports the number of constellation patterns used in modulation section 102 and the number of replications by repetition section 103 with respect to the OFDM signal to be transmitted, to radio reception apparatus 150 using a control channel.

Reception RF section 111 has, for example, an analog/digital converter, low noise amplifier, band pass filter, and performs predetermined radio reception processing on a control information signal from radio reception apparatus 150 received by antenna element 109. This control information signal will be described later. Then, reception RF section 111 inputs the control information signal after the radio reception processing to control information extracting section 112.

Control information extracting section 112 extracts information of the modulation scheme determined in radio reception apparatus 150, information of the number of transmission symbols generated from an item of transmission data determined in radio reception apparatus 150, and information of the dispersion of reception quality measured in radio reception apparatus 150 from the control information signal inputted from reception RF section 111, and reports each extracted information to repetition/constellation pattern ratio determining section 113.

Based on the dispersion of reception quality reported from control information extracting section 112, repetition/constellation pattern ratio determining section 113 determines a ratio between the number of constellation patterns to be used in modulation section 102 and the number of replications by repetition section 103. More specifically, repetition/constellation pattern ratio determining section 113 adjusts the number of constellation patterns to be used in modulation section 102 and the number of replications by repetition section 103 so that the product of the number of constellation patterns used in modulation section 102, that is, the number of generated transmission symbols and the number of replications of that transmission symbols by repetition section 103 is the number of transmission symbols generated from an item of transmission data reported from control information extracting section 112. Further, when adjusting the number of constellation patterns to be used in modulation section 102 and the number of replications by repetition section 103, repetition/constellation pattern ratio determining section 113 makes adjustments to decrease the number of constellation patterns to be used in modulation section 102 when the dispersion of reception quality reported from control information extracting section 112 increases, and increase the number of constellation patterns to be used in modulation section 102 when the dispersion of reception quality decreases. Then, repetition/constellation pattern ratio determining section 113 reports the determined number of constellation patterns and the modulation scheme reported from control information extracting section 112 to constellation pattern instructing section 114, and further reports the determined number of replications to number of repetitions instructing section 115.

Based on the modulation scheme and the number of constellation patterns reported from repetition/constellation pattern ratio determining section 113, constellation pattern instructing section 114 reports all constellation patterns included in a combination of constellation patterns corresponding to the modulation scheme and the number of constellation patterns to modulation section 102, and instructs modulation section 120 to generate transmission symbols using all the constellation patterns.

In synchronization with a timing at which a transmission symbol is input to repetition section 103 from modulation section 102, number of repetitions instructing section 115 reports the number of replications reported from repetition/constellation pattern ratio determining section 113 to repetition section 103, and instructs repetition section 103 to replicate the transmission symbol up to the number of replications.

Meanwhile, radio reception apparatus 150 as shown in FIG. 3 has antenna element 151, reception RF section 152, GI removing section 153, fast Fourier transform (FFT) section 154, reception quality measuring section 155, reception quality dispersion measuring section 156, MCS (Modulation and Coding Scheme) determining section 157, symbol combination/bit combination instructing section 158, number of symbols for combination instructing section 159, constellation pattern instructing section 161, symbol deinterleaving section 162, symbol combining section 163, bit likelihood calculating section 164, error correction decoding section 165, control information generating section 166 and transmission RF section 167.

Reception RF section 152 has, for example, an analog/digital converter, low noise amplifier, and band pass filter, performs predetermined radio reception processing on the OFDM signal from radio transmission apparatus 100 received in antenna element 151, and inputs the OFDM signal after the radio reception processing to GI removing section 153. Reception RF section 152 further performs radio reception processing on the control channel signal from radio transmission apparatus 100 received by antenna element 151, and inputs the control channel signal after the radio reception processing to symbol combination/bit combination instructing section 158.

GI removing section 153 removes a GI from the OFDM signal inputted from reception RF section 152, and inputs the OFDM signal from which the GI is removed to FFT section 154.

FFT section 154 performs FFT processing on the OFDM signal inputted from GI removing section 153 and generates a reception symbol (parallel signal). Then, FFT section 154 inputs the generated reception symbol to reception quality measuring section 155 and symbol deinterleaving section 162.

Reception quality measuring section 155 measures reception quality, that is, a reception SIR (Signal to Interference Rate) of the reception symbol inputted from FFT section 154 on the basis of a symbol of an OFDM signal basis, and reports the measurement result to reception quality dispersion measuring section 156 and MCS determining section 157.

Based on the reception quality of the reception symbol inputted from reception quality measuring section 155, reception quality dispersion measuring section 156 measures dispersion of the reception quality, and reports the measurement result to control information generating section 166.

Based on the measurement result of the reception quality reported from reception quality measuring section 155, MCS determining section 157 determines a modulation scheme to be used in radio transmission apparatus 100. In other words, as the reception quality reported from reception quality measuring section 155 is higher, MCS determining section 157 allows radio transmission apparatus 100 to use a modulation scheme with a higher bit rate. Further, MCS determining section 157 determines the number of transmission symbols to be generated from an item of transmission data in modulation section 102 and repetition section 103. Then MCS determining section 157 reports the determined number of transmission symbols and determined modulation scheme to symbol combination/bit combination instructing section 158 and control information generating section 166.

Symbol combination/bit combination instructing section 158 obtains the number of constellation patterns used in the received OFDM signal and the number of replications in a single constellation pattern, from the control channel signal inputted from reception RF section 152, reports the obtained number of replications for a single constellation pattern to number of symbols for combination instructing section 159, and further reports the obtained number of constellation patterns and the modulation scheme reported from MCS determining section 157 to constellation pattern instructing section 161.

Number of symbols for combination instructing section 159 instructs symbol combining section 163 to perform symbol combination on reception symbols on a basis of the number of replications in the single constellation pattern.

Based on the modulation scheme and the number of constellation patterns reported from symbol combination/bit combination instructing section 158, constellation pattern instructing section 161 reports all constellation patterns included in a combination of constellation patterns corresponding to the modulation scheme and the number of constellation patterns to bit likelihood calculating section 164, and instructs bit likelihood calculating section 164 to demodulate reception symbols using all those reported constellation patterns.

Symbol deinterleaving section 162 deinterleaves the reception symbol inputted from FFT section 154, converts the deinterleaved reception symbol from the parallel signal to a serial signal, and inputs the converted reception symbol to symbol combining section 163.

Symbol combining section 163 performs symbol combination on the reception symbol inputted from symbol deinterleaving section 162 on a basis of the number of the single constellation pattern reported from number of symbols for combination instructing section 159. Then, symbol combining section 163 inputs the symbol-combined reception symbol to bit likelihood calculating section 164.

Using the constellation pattern reported from constellation pattern instructing section 161, bit likelihood calculating section 164 demodulates the reception symbol after symbol combination. Further, bit likelihood calculating section 164 performs bit combination on the demodulated reception symbol on a basis of the number of constellation patterns reported from constellation pattern instructing section 161. For example, when four constellation patterns are reported, bit likelihood calculating section 164 performs bit combination every four constellation patterns. Then, bit likelihood calculating section 164 makes a soft decision on the reception symbol after bit combination, calculates likelihood per bit (bit likelihood) based on the soft decision value, makes a hard decision based on the calculated bit likelihood to generate reception data, and inputs the generated reception data to error correction decoding section 165.

Using an error correction decoding scheme corresponding to the error correction coding scheme used in error correction coding section 101, error correction decoding section 165 performs error correction decoding on the reception data inputted from bit likelihood calculating section 164, and inputs the reception data after error correcting decoding to, for example, a baseband section (not shown).

Control information generating section 166 generates a control information signal including the modulation scheme and the number of transmission symbols generated from an item of transmission data reported from MCS determining section 157 and the measurement result of the dispersion of reception quality reported from reception quality dispersion measuring section 156, and inputs the generated control information signal to transmission RF section 167.

Transmission RF section 167 has, for example, a digital/analog converter, low noise amplifier and band pass filter, performs predetermined radio transmission processing on the control information signal inputted from control information generating section 166, and transmits the processed control information signal to radio transmission apparatus 100 via antenna element 151.

Next, the operations of radio transmission apparatus 100 and radio reception apparatus 150 will be described with reference to FIGS. 4, 5 and 6A to 6C.

Figure 4:
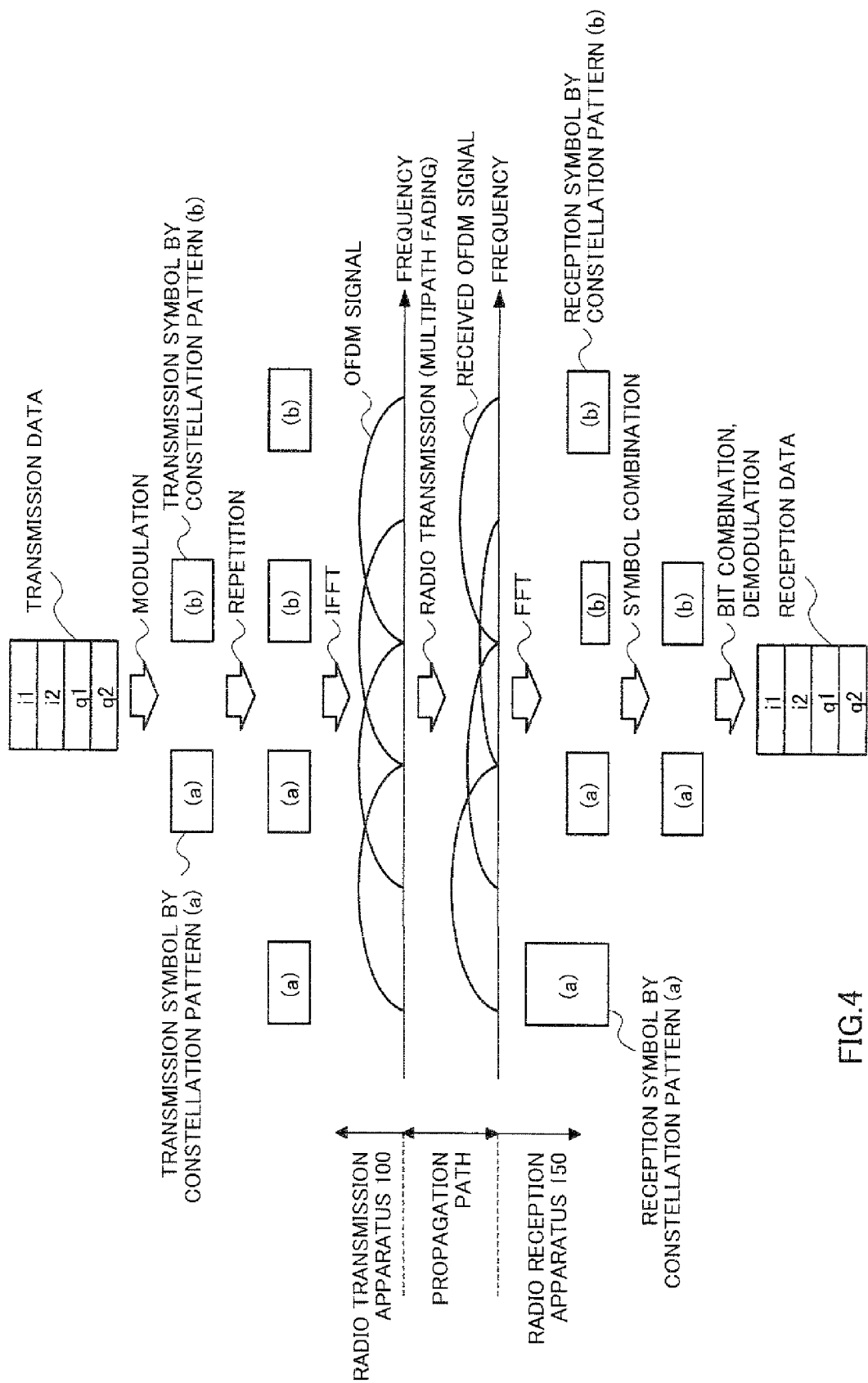
FIG. 4 is a diagram showing a flow of signal processing according to one embodiment of the present invention.

FIG. 4 shows an example of a series of signal processing of transmission data from being transmitted from radio transmission apparatus 100 to being generated as reception data in radio reception apparatus 150. In the example as shown in FIG. 4, it is assumed that modulation section 102 uses two constellation patterns and generates two transmission symbols and repetition section 103 replicates each of the two transmission symbols once and generates total four transmission symbols.

In the example as shown in FIG. 4, first, modulation section 102 modulates the transmission data using two constellation patterns (a) and (b), thereby generating transmission symbols (a) and (b). Next, repetition section 103 replicates each of the transmission symbols (a) and (b) once, and generates two transmission symbols (a) and two transmission symbols (b), that is, total four transmission symbols. Then, component parts of radio transmission apparatus 100 generate a single OFDM signal comprised of the four transmission symbols, and transmit this radio OFDM signal to radio reception apparatus 150.

Then, radio reception apparatus 150 receives the OFDM signal subjected to influence of multipath fading on the propagation path. Next, component parts in radio reception section 150 generate two reception symbols (a) and two reception symbols (b) from the OFDM signal, that is, total four reception symbols. In FIG. 4, sizes of the generated four reception symbols are different from one another. This is because the symbols are subjected to influence such as fading on the propagation path. Then, symbol combining section 163 performs symbol combination on the two reception symbols (a), and further performs symbol combination on the two reception symbols (b). Next, bit likelihood calculating section 164 demodulates the reception symbol (a) and reception symbol (b) subjected to symbol combination, performs bit combination, thereby generating reception data.

Figure 5:
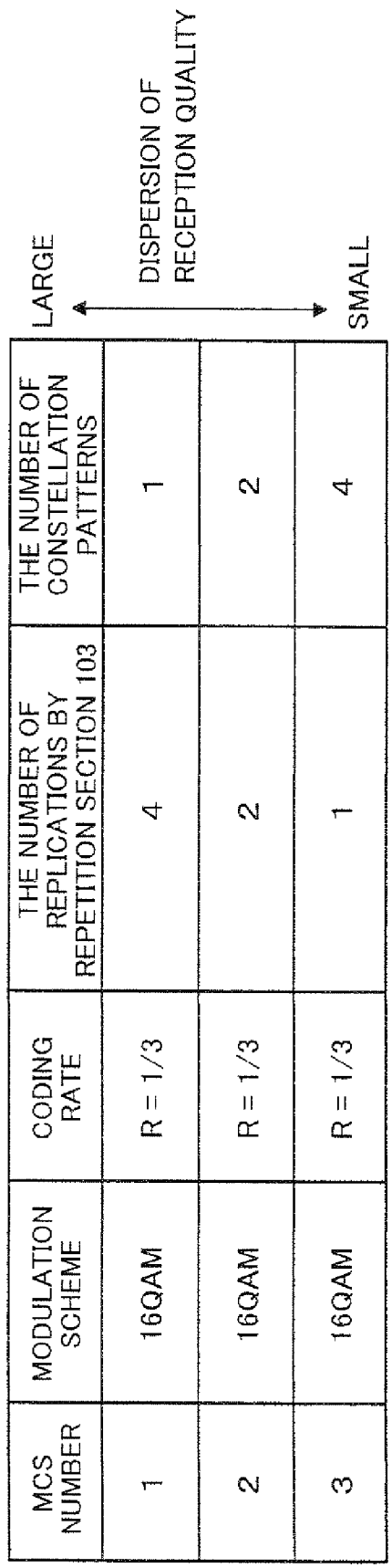
FIG. 5 is a diagram showing an example of modulation setting according to one embodiment of the present invention.

FIG. 5 shows three combinations (MCS numbers 1 to 3) of the number of constellation patterns used in modulation section 102 and the number of replications (number of replications after replication) by repetition section 103 when MCS determining section 157 determines that 16QAM is a modulation scheme to be used in radio transmission apparatus 100 and the number of transmission symbols to be generated from an item of transmission data is four. In addition, it is assumed that the coding rate in error correction coding section 101 is R=1/3 in all of MCS numbers 1 to 3.

As is evident from FIG. 5, in MCS number 1, modulation section 102 uses one constellation pattern, and repetition section 103 makes four replications of a transmission symbol by this constellation pattern. Similarly, in MCS number 2, modulation section 102 uses two constellation patterns, and repetition section 103 makes two replications of transmission symbols by these two constellation patterns respectively— that is, total four symbols. Similarly, in MCS number 3, modulation section 102 uses four constellation patterns, and repetition section 103 does not make replications of these transmission symbols.

Further, as described above, when the dispersion of reception quality of the received signal is large, the diversity gain is easier to obtain in symbol combination than in bit combination, and when the dispersion of the reception quality is small, the diversity gain is easier to obtain in bit combination than in symbol combination. Therefore, repetition/constellation pattern ratio determining section 113 preferably adopts MCS number 2 and MCS number 1 rather than MCS number 3 when the dispersion of the reception quality reported from control information extracting section 112 increases, and adopts MCS number 2 and MCS number 3 rather than MCS number 1 when the dispersion of the reception quality decreases.

Figure 6A:
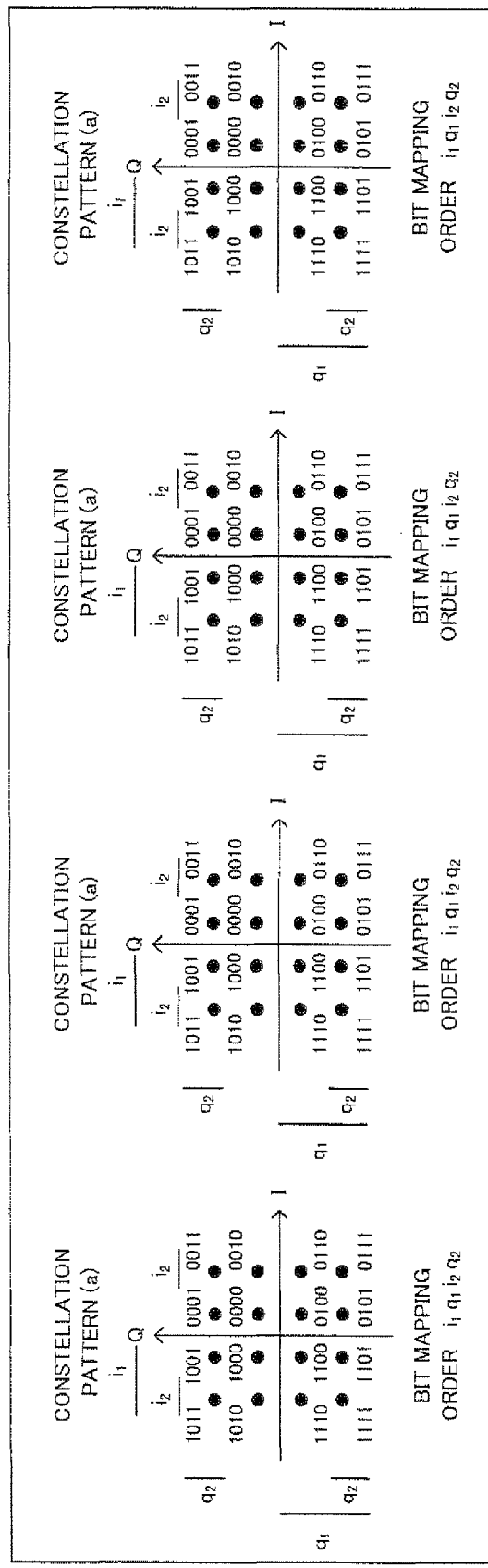
FIG. 6A is a view showing combinations of constellation patterns according to one embodiment of the present invention.
Figure 6B:
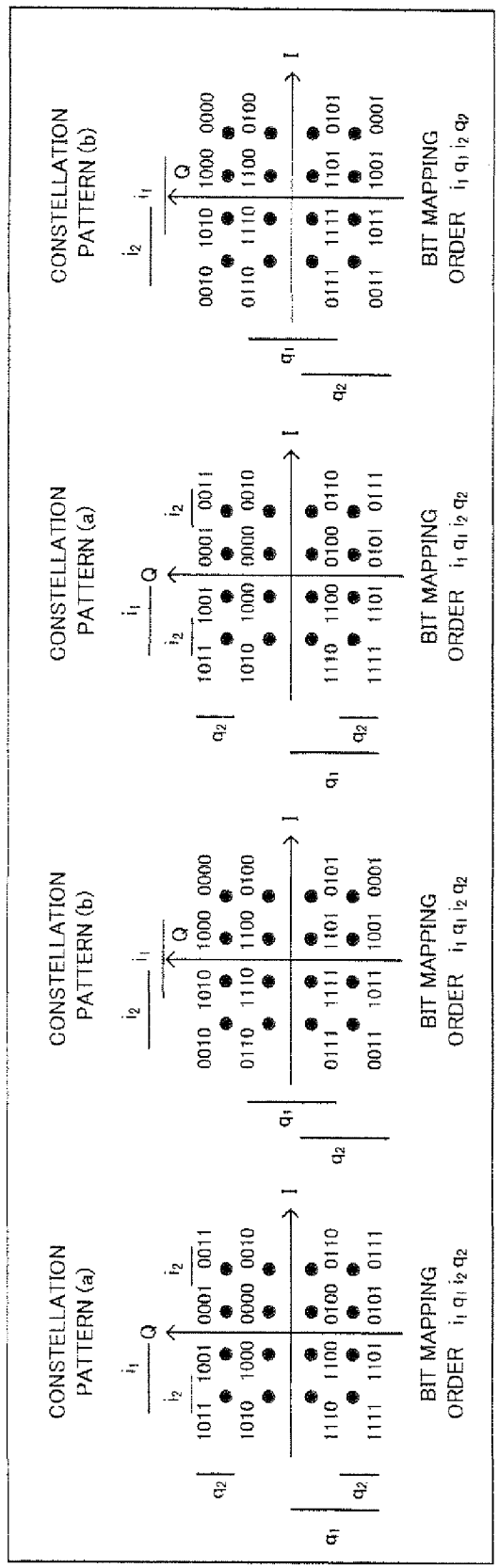
FIG. 6B is a view showing other combinations of constellation patterns according to one embodiment of the present invention.
Figure 6C:
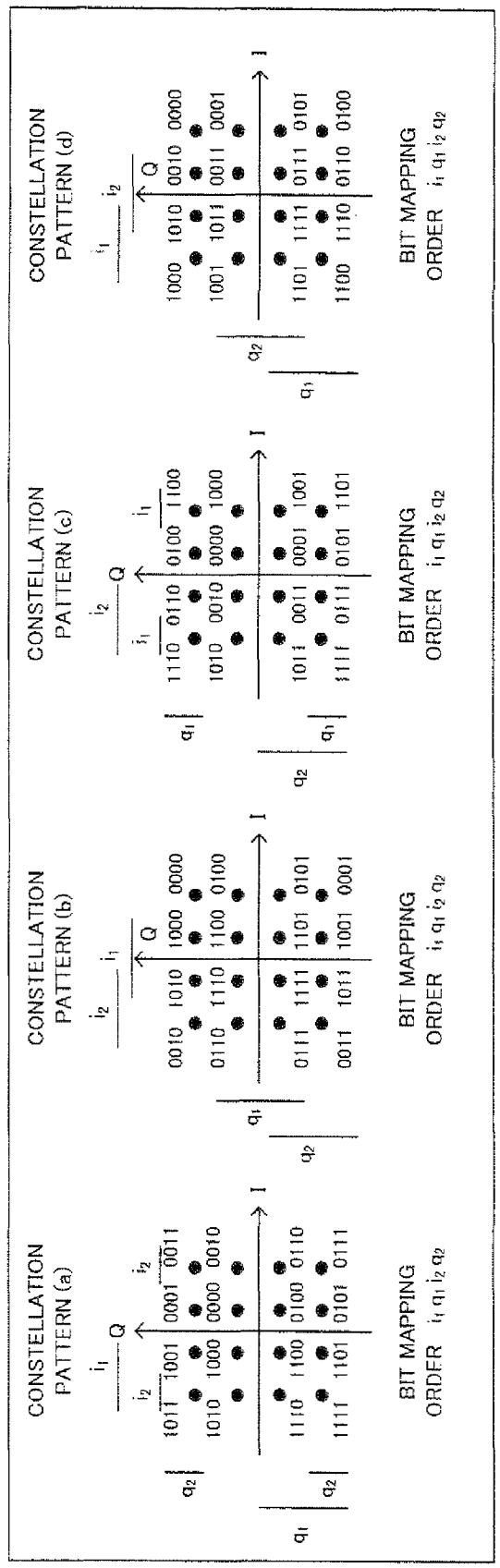
FIG. 6C is a view showing still other combinations of constellation patterns according to one embodiment of the present invention.

FIGS. 6A to 6C show mapping positions on the IQ plane for four constellation patterns (a) to (d) that are usable in modulation by 16QAM. FIGS. 6A to 6C further show combinations of constellation patterns used for total four transmission symbols generated by modulation section 102 and repetition section 103. More specifically, FIG. 6A shows a mode where four constellation patterns (a) are combined in a case of MCS number 1. Similarly, FIG. 6B shows a mode where two constellation patterns (a) and two constellation patterns (b) are combined in a case of MCS number 2. FIG. 6C shows a mode where constellation patterns (a) to (d) are combined in a case of MCS number 3.

Here, with respect to constellation patterns usable in modulation by 16QAM as shown in FIGS. 6A to 6C, constellation pattern (a) will be described in detail as an example. When a bit mapping order of a transmission symbol is "$i_1, q_1, i_2, q_2$," soft decision are made on two higher-order bits "$i_1, q_1$" using a determination threshold of a range of "$i_1$" in the figure for the in-phase component, and further using a determination threshold of a range of "$q_1$" in the figure for the quadrature component. Meanwhile, soft decisions are made on two lower-order bits, "$i_2, q_2$" using a determination threshold of a range of "$i_2$" for the in-phase component, and further using a determination threshold of a range of "$q_2$" for the quadrature component. Accordingly, as is evident from FIGS. 6A to 6C, the ranges of the determination thresholds of two lower-order bits, "$i_2, q_2$", are smaller than the ranges of the determination thresholds of two higher-order bits, "$i_1, q_1$", and it is understood that two lower-order bits are easier to be subjected to influence such as fading and to cause bit errors than two higher-order bits.

Therefore, in the present invention, transmission data is modulated and replicated using a plurality of constellation patterns, higher-order bits and lower-order bits are thereby exchanged to generate a plurality of transmission symbols. Further, these transmission symbols are transmitted in a single radio multicarrier signal, and the diversity gain by bit combination is thus obtained to compensate for weak error tolerance of lower-order bits.

Thus, according to the present invention, transmission data is modulated and replicated using a plurality of constellation patterns to generate a plurality of transmission symbols, the generated transmission symbols are transmitted in a single OFDM signal, so that it is possible for the receiving side to obtain the diversity gain in the frequency domain.

Further, according to the present invention, symbol combination and bit combination are both performed on the received OFDM signal, so that even when the dispersion of reception quality of the OFDM signal is large, the diversity gain can reliably be obtained.

Furthermore, according to the present invention, transmission data is modulated using all of the four constellation patterns usable in 16QAM, so that the diversity gain is effectively improved on the receiving side when the dispersion of reception quality is small.

Still furthermore, according to the present invention, the number of constellation patterns and the number of replications (number of repetitions) are determined based on the dispersion of reception quality, so that the diversity gain can reliably be obtained irrespective of the degree of the dispersion of reception quality.

Moreover, according to the present invention, the number of constellation patterns is adaptively adjusted according to the dispersion of reception quality, so that the diversity gain can reliably be obtained even when the dispersion of reception quality varies, that is, the propagation path condition varies.

In addition, although a case has been described in the above-mentioned embodiment where the coding rate is fixed to R=1/3, the present invention is not limited to this case, and, for example, MCS determining section 157 may decrease the coding rate to improve the bit error rate when the reception quality decreases, and increase the coding rate to improve throughput when the reception, quality increases based on the measurement result of the reception quality in reception quality measuring section 155.

Further, although a case has been described in the above-mentioned embodiment where the transmission data is modulated in modulation section 102 and then replicated in repetition section 103 in radio transmission apparatus 100, the present invention is not limited to this case, and, for example, modulation section 102 and repetition section 103 may be exchanged in configuration so that repetition section 103 first replicates the transmission data up to the number of transmission symbols generated from an item of transmission data determined in MCS determining section 157, and modulation section 102 modulates the replicated transmission data sequentially with the specified constellation pattern.

Furthermore, although a case has been described in the above-mentioned embodiment where repetition/constellation pattern ratio determining section 113 determines both the number of constellation patterns to be used in modulation section 102 and the number of replications by repetition section 103, the present invention is not limited to this case, and for example, MCS determining section 157 may determine the numbers directly. In this way, radio transmission apparatus 100 does not have to report these numbers to radio reception apparatus 150, and it is possible to improve throughput.

Still furthermore, although a case has been described in the above-embodiment where repetition/constellation pattern ratio determining section 113 adjusts the ratio of the number of constellation patterns to be used in modulation section 102 and the number of replications by repetition section 103 based on the modulation scheme and the dispersion of reception quality reported from control information extracting section 112, the present invention is not limited to this case, and, for example, the ratio of the number of constellation patterns to be used in modulation section 102 and the number of replications by repetition section 103 may be fixed. In this way, a plurality of component parts can be halted in radio transmission apparatus 100 and radio reception apparatus 150, so that it is possible to reduce loads and power consumption of signal processing in these apparatuses.

Moreover, although a case has been described in the above-mentioned embodiment where the constellation patterns (a) and (b) are combined as shown in FIG. 6B when modulation section 102 modulates transmission data using two constellation patterns in 16QAM, the present invention is not limited to this case, and for example, constellation patterns (a) and (c), constellation patterns (a) and (d), constellation patterns (b) and (c), constellation patterns (b) and (d), or constellation patterns (c) and (d) may be combined, respectively.

In addition, although a case has been described in the above-mentioned embodiment where four constellation patterns are used in 16QAM, it is also possible to use six constellation patterns in 64QAM, and eight constellation patterns in 256QAM.

Further, the present invention is applicable to not only frequency division multiplexing such as OFDM but also time division multiplexing, spatial division multiplexing and code division multiplexing. When the present invention is applied to time division multiplexing, it is possible to response to the dispersion of reception quality caused by fluctuation of reception power in the time domain due to a fast move of a communication terminal apparatus. Further, when the present invention is applied to spatial division multiplexing, it is possible to response to the dispersion of reception quality caused by a difference in quality between streams due to multipath channel. Furthermore, when the present invention is applied to code division multiplexing, it is possible to response to the dispersion of reception quality caused by intersymbol interference.

Furthermore, a case has been described as an example in the above-mentioned embodiment where the present invention is configured by hardware, the present invention can be implemented by software.

In addition, each of functional blocks employed in the description of the above-mentioned embodiment may typically be implemented as an LSI constituted by an integrated circuit. These are may be individual chips or partially or totally contained on a single chip. "LSI" is adopted here but this may also be referred to as an "IC", "system LSI", "super LSI", or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

The present application is based on Japanese Patent Application No. 2004-140968 filed on May 11, 2004, the entire content of which is expressly incorporated by reference herein.

Industrial Applicability

The present invention is useful, for example, as a base station apparatus and communication terminal apparatus that are components of a multicarrier communication system.

The invention claimed is:

1. A radio transmission apparatus comprising:
a modulation section that modulates the same data using a plurality of constellation patterns having the same modulation scheme and different bit mapping orders, to generate a plurality of symbols;
a repetition section that performs repetition on the plurality of symbols;
a generation section that generates a multiplexed signal by multiplexing the plurality of symbols subjected to the repetition; and
a transmission section that transmits the multiplexed signal.

2. The radio transmission apparatus according to claim 1, wherein the modulation section derives a number of the constellation patterns used for the modulation according to dispersion of reception quality measured on a receiving side of the multiplexed signal.

3. The radio transmission apparatus according to claim 2, wherein the modulation section decreases the number of constellation patterns when the dispersion increases, and increases the number of constellation patterns when the dispersion decreases.

4. The radio transmission apparatus according to claim 1, wherein the repetition section derives a number of repetitions according to dispersion of reception quality measured on a receiving side of the multiplexed signal.

5. The radio transmission apparatus according to claim 4, wherein the repetition section increases the number of repetitions when the dispersion increases, and decreases the number of repetitions when the dispersion decreases.

6. The radio transmission apparatus according to claim 1, wherein a product of a number of the constellation patterns and a number of repetitions is equal to a number of the plurality of symbols included in the multiplexed signal.

7. The radio transmission apparatus according to claim 1, wherein the repetition section derives a ratio between a number of the constellation patterns and a number of repetitions, according to dispersion of reception quality measured on a received side of the multiplexed signal.

8. The radio transmission apparatus according to claim 7, wherein the repetition section decreases the number of constellation patterns and increases the number of repetitions when the dispersion increases, and increases the number of constellation patterns and decreases the number of repetitions when the dispersion decreases.

9. A transmission method performed by a radio transmission apparatus, the transmission method comprising:
    modulating the same data using a plurality a plurality of constellation patterns having the same modulation scheme and different bit mapping orders, to generate a plurality of symbols;
    performing repetition on the plurality of symbols;
    generating a multiplexed signal by multiplexing the plurality of symbols subjected to the repetition; and
    transmitting the multiplexed signal.

\* \* \* \* \*

UNITED STATES PATENT AND TRADEMARK OFFICE
CERTIFICATE OF CORRECTION

| | | |
|---|---|---|
| PATENT NO. | : 8,149,949 B2 | |
| APPLICATION NO. | : 12/551126 | |
| DATED | : April 3, 2012 | |
| INVENTOR(S) | : Kenichi Miyoshi | |

It is certified that error appears in the above-identified patent and that said Letters Patent is hereby corrected as shown below:

Claim 9, column 12, line 12, reads:

"modulating the same data using a plurality a plurality of"

and should read:

"modulating the same data using a plurality of"

Signed and Sealed this
Eleventh Day of December, 2012

David J. Kappos
*Director of the United States Patent and Trademark Office*